US012776848B2

(12) United States Patent
Lu

(10) Patent No.: US 12,776,848 B2
(45) Date of Patent: Oct. 27, 2026

(54) OPTICAL FIBER CONNECTION DISCOVERY METHOD, ELECTRONIC DEVICE, AND COMPUTER READABLE STORAGE MEDIUM

(71) Applicant: ZTE CORPORATION, Shenzhen (CN)

(72) Inventor: Hongfei Lu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 271 days.

(21) Appl. No.: 18/568,204

(22) PCT Filed: Jun. 20, 2022

(86) PCT No.: PCT/CN2022/099983
§ 371 (c)(1),
(2) Date: Dec. 7, 2023

(87) PCT Pub. No.: WO2022/268040
PCT Pub. Date: Dec. 29, 2022

(65) Prior Publication Data

US 2024/0291583 A1 Aug. 29, 2024

(30) Foreign Application Priority Data

Jun. 23, 2021 (CN) ......................... 202110697077.9

(51) Int. Cl.
*H04J 14/02* (2006.01)
*H04J 3/16* (2006.01)
*H04Q 11/00* (2006.01)

(52) U.S. Cl.
CPC ........ *H04J 14/0212* (2013.01); *H04J 3/1652* (2013.01); *H04J 14/0272* (2013.01);
(Continued)

(58) Field of Classification Search
CPC ............. H04J 14/02; H04J 3/16; H04Q 11/00
See application file for complete search history.

(56) References Cited

U.S. PATENT DOCUMENTS 8,811,816 B2 8/2014 Li
9,143,846 B2 * 9/2015 Kikuchi ............. H04J 14/0212
(Continued)

FOREIGN PATENT DOCUMENTS

CN 105634605 A 6/2016
CN 105812051 A * 7/2016
(Continued)

OTHER PUBLICATIONS

David T. Neilson et al.,"Wavelength Selective Switching for Optical Bandwidth Management," Summer 2006,Bell Labs Technical Journal 11(2),pp. 106-117.*
(Continued)

*Primary Examiner* — Omar S Ismail
(74) *Attorney, Agent, or Firm* — NZ Carr Law Office

(57) ABSTRACT

Embodiments of the present application relate to the technical field of optical communications, and particularly relate to an optical fiber connection discovery method, an electronic device, and a computer readable storage medium. The method comprises: turning off each laser in a network element to be processed; turning on a target laser; and determining a connection position of an optical fiber of the target laser in an optical signal propagation direction according to a configuration state of each wavelength selective switch (WSS) of said network element and an optical detection result of each port of said network element.

17 Claims, 8 Drawing Sheets

(52) U.S. Cl.
CPC ..... *H04Q 11/0003* (2013.01); *H04Q 11/0062* (2013.01); *H04Q 2011/0083* (2013.01)

(56) References Cited

U.S. PATENT DOCUMENTS

| | | | | |
|---|---|---|---|---|
| 9,197,354 | B2 * | 11/2015 | Boertjes | H04J 14/0212 |
| 9,264,167 | B2 * | 2/2016 | Takatsu | H04J 14/0204 |
| 9,913,008 | B1 * | 3/2018 | Keyworth | H04Q 11/0005 |
| 10,009,671 | B2 * | 6/2018 | Younce | H04J 14/02126 |
| 11,057,690 | B2 * | 7/2021 | Al Sayeed | H04Q 11/0005 |
| 2003/0163555 | A1 * | 8/2003 | Battou | G06F 8/65 709/223 |
| 2008/0002974 | A1 * | 1/2008 | Zhong | H04J 14/0217 398/48 |
| 2009/0067845 | A1 * | 3/2009 | Zhong | H04J 14/0209 398/83 |
| 2010/0028007 | A1 * | 2/2010 | Miura | H04J 14/0217 398/81 |
| 2010/0129082 | A1 * | 5/2010 | Zhong | H04J 14/02126 398/83 |
| 2010/0260499 | A1 * | 10/2010 | Izumi | H04J 14/0307 398/48 |
| 2011/0158658 | A1 * | 6/2011 | Myslinski | H04J 14/02 398/208 |
| 2012/0087657 | A1 * | 4/2012 | Jander | H04J 14/02 398/48 |
| 2013/0028592 | A1 * | 1/2013 | Fujii | H04Q 11/0005 398/5 |
| 2014/0119728 | A1 * | 5/2014 | Zhang | H04J 14/0205 398/48 |
| 2014/0270761 | A1 * | 9/2014 | Xu | H04Q 11/0005 398/45 |
| 2014/0341568 | A1 * | 11/2014 | Zhang | H04Q 11/0005 398/34 |
| 2015/0104170 | A1 * | 4/2015 | Xia | H04J 14/0202 398/48 |
| 2015/0155964 | A1 * | 6/2015 | Han | H04Q 11/0005 398/50 |
| 2015/0208146 | A1 | 7/2015 | Younce et al. | |
| 2016/0173964 | A1 * | 6/2016 | Weldon | H04J 14/0212 398/48 |
| 2016/0261364 | A1 * | 9/2016 | Jiang | H04B 10/503 |
| 2016/0316281 | A1 * | 10/2016 | Keyworth | H04J 14/0213 |
| 2018/0167142 | A1 * | 6/2018 | Vassilieva | H04Q 11/0005 |
| 2018/0234200 | A1 * | 8/2018 | Bottari | H04J 14/0204 |
| 2019/0013863 | A1 * | 1/2019 | Kurosu | H04B 10/077 |
| 2020/0036467 | A1 * | 1/2020 | Tse | H04B 10/0773 |

FOREIGN PATENT DOCUMENTS

| | | | | |
|---|---|---|---|---|
| EP | 2860908 | A1 | 4/2015 | |
| JP | 2008252579 | A | 10/2008 | |
| JP | 7287806 | B2 * | 6/2023 | H04J 14/0219 |
| WO | 2008028362 | A1 | 3/2008 | |
| WO | 2013123764 | A1 | 8/2013 | |

OTHER PUBLICATIONS

C. Zervosa et al.,"A new generation of high-speed electro-optical transceivers and flexible bandwidth wavelength selective switches for coherent DCI:The QAMeleon project approach," Mar. 4, 2019, Proc. of SPIE vol. 10924, pp. 1-13.*

Aruna Rani et al.,"Performance evaluation of the dense wavelength division multiplexing system using reconfigurable optical add/drop multiplexer based on digital switches," Oct. 22, 2020, Optical and Quantum Electronics (2020) 52:480,pp. 1-10.*

Nitin Manohar et al.,"Auto-detection of misconnected fibers in WSS based multi-degree ROADM," Feb. 8, 2010,2009 IEEE 3rd International Symposium on Advanced Networks and Telecommunication Systems (ANTS),pp. 1-4.*

Steven Gringeri et al.,"Flexible Architectures for Optical Transport Nodes and Networks," Aug. 16, 2010,IEEE Communications Magazine ,Jul. 2010, pp. 40-49.*

Jan Kundrát et al.,"Opening up ROADMs: Let Us Build a Disaggregated Open Optical Line System," Mar. 27, 2019, Journal of Lightwave Technology, vol. 37, No. 16, Aug. 15, 2019,pp. 4041-4049.*

Pablo Jesus Argibay-Losada et al.,"Optical Packet Switching and Optical Burst Switching ," 2020, Code Networks, Part B ,20 , pp. 665-697.*

(ISA/237) Written Opinion of the International Searching Authority dated Aug. 26, 2022.

The international search report of the corresponding PCT Application No. PCT/CN2022/099983 mailed on Aug. 26, 2022 along with English translation thereof.

Nitin, Manohar etc."Auto-detection of misconnected fibers in WSS based multi-degree ROADM" 2009 IEEE 3rd International Symposium on Advanced Networks and Telecommunication Systems(ANTS), Feb. 8, 2010.

EESR of the corresponding EP Patent Application No. 22827533.5 dated Sep. 27, 2024.

Kundrat Jan et al:"Opening up ROADMs: Let Us Build a Disaggregated Open Optical Line System", Journal of LightwaveTechnology, IEEE, USA , vol. 37, No. 16, Aug. 15, 2019(Aug. 15, 2019) , pp. 4041-4051 , XP011736995, ISSN: 0733-8724 , DOI: 10.1109/JLT.2019.2906620 [retrieved on Jul. 31, 2019] * Part F Miscellaneous Requirements and Add-On Features *.

* cited by examiner

OPTICAL FIBER CONNECTION DISCOVERY METHOD, ELECTRONIC DEVICE, AND COMPUTER READABLE STORAGE MEDIUM

CROSS REFERENCE TO RELATED APPLICATIONS

The present application is proposed based on and claims priority to the Chinese patent application No. 202110697077.9 filed on Jun. 23, 2021, the entire content of which is incorporated herein by reference.

TECHNICAL FIELD

Embodiments of the present application relate to the technical field of optical communications, and particularly relate to an optical fiber connection discovery method, an electronic device, and a computer readable storage medium.

BACKGROUND

An optical transport network (OTN) technology is a new type of optical transport technology, which not only has advantages of a synchronous digital hierarchy (SDH) technology and a wavelength division multiplexing (WDM) technology, but also has advantages of large network capacity and good control mechanism. A reconfigurable optical add/drop multiplexer (ROADM) networking technology based on a wavelength selective switch (WSS) can achieve flexible optical switching in any wavelength and any direction. The ROADM networking technology has become a key development direction for OTN networking.

However, by sending and receiving specific messages between ports, and identifying fields at specific positions within the messages, a technical solution for automatic discovery of optical fiber connection is achieved. In an actual networking process, service units that send and receive the specific messages need to access to a network before fiber connection, which results in the inability of the specific messages to be sent between the ports, and make it impossible to achieve automatic optical fiber discovery. In this way, it can only rely on manual fiber connection, however, a scale of the optical transmission network is huge, resulting in high operation and maintenance pressures, and high operation and maintenance costs.

SUMMARY

An embodiment of the present application provides an optical fiber connection discovery method, including: turning off each laser in a network element to be processed; turning on a target laser; and determining a connection position of an optical fiber of the target laser in an optical signal propagation direction according to a configuration state of each wavelength selective switch (WSS) of the network element to be processed and an optical detection result of each port of the network element to be processed.

An embodiment of the present application further provides an electronic device, including: at least one processor; and a memory in communication connection with the at least one processor, wherein the memory stores instructions executable by the at least one processor, and the instructions are executed by the at least one processor, so that the at least one processor can execute the above optical fiber connection discovery method.

An embodiment of the present application further provides a computer readable storage medium, storing a computer program. The computer program, when executed by a processor, implements the above optical fiber connection discovery method.

DETAILED DESCRIPTION

The main objective of embodiments of the present application is to provide an optical fiber discovery method, an electronic device, and a computer readable storage medium, aiming to quickly and accurately discover optical fiber connection positions of physical connection fibers of a network element automatically, greatly alleviating operation and maintenance pressures, reducing operation and maintenance costs, and improving operation and maintenance efficiency.

In order to make the objective, technical solutions and advantages of embodiments of the present application clearer, all embodiments of the present application will be described below in detail with reference to accompanying drawings. However, the ordinarily skilled in the art can understand that in various embodiments of the present application, many technical details have been proposed to enable readers to better understand the present application. However, even without these technical details and various changes and modifications based on the following embodiments, the technical solution required for protection in the present application can still be achieved. The division of the following embodiments is for convenience in description and should not constitute any limitations on the specific implementations of the present application. All the embodiments can be combined and referenced with each other without contradiction.

In order to facilitate the understanding of the embodiments of the present application, several concepts introduced by the embodiments of the present application are first introduced here.

OTN: OTN is a transport network based on a wavelength division multiplexing technology and organizing a network in an optical layer, and is the next generation backbone transport network. OTN is a new generation of “digital transport system” and “optical transport system” standardized through a series of protocols from the International Telecommunication Union-Telecommunications Standardization Sector (ITU-T), such as G.872, G.709, and G.798. The OTN technology will solve problems that a traditional WDM network does not have a wavelength-free/sub-wavelength service scheduling capability, is weak in networking capability, and weak in protection capability.

Figure 1:
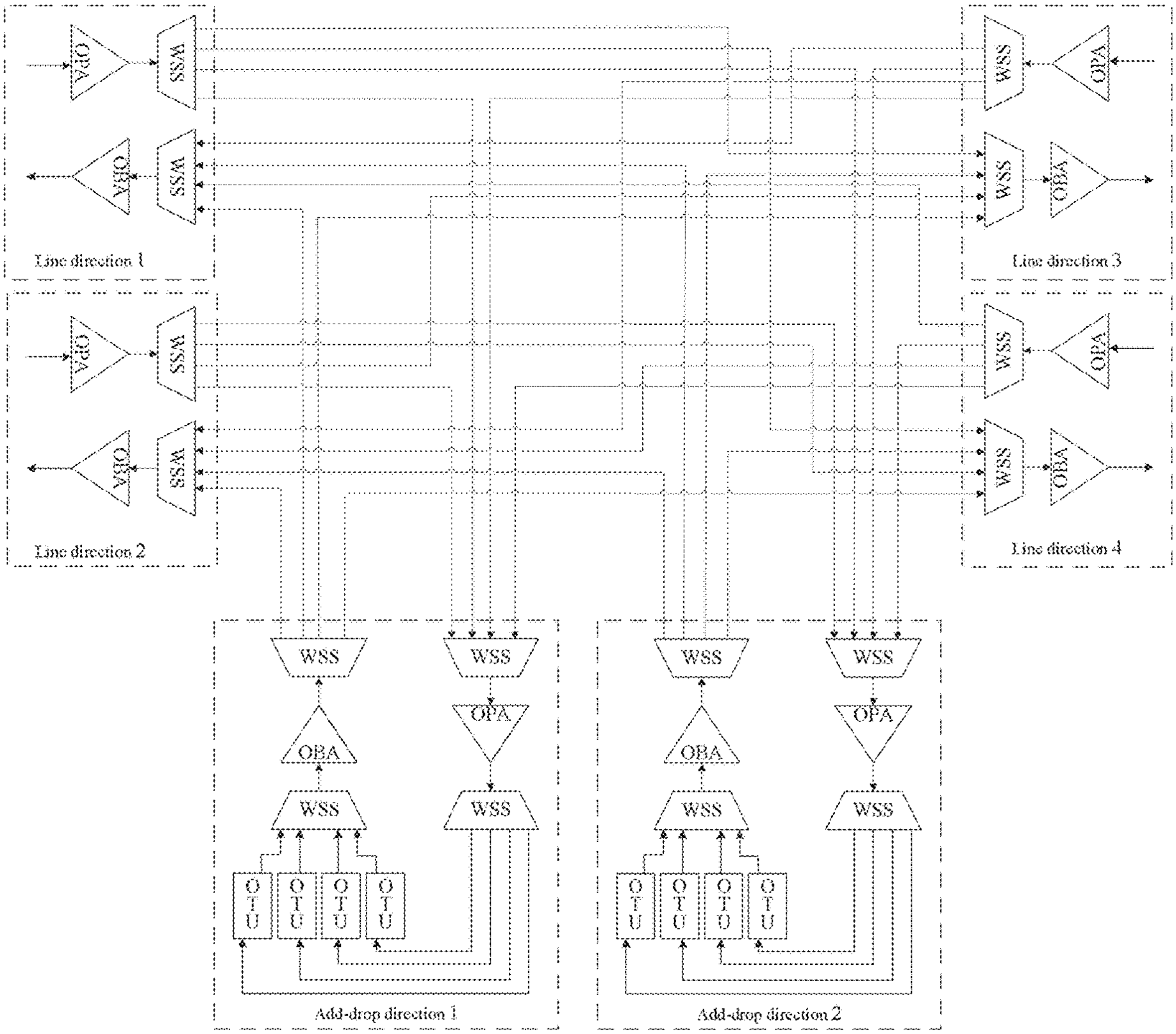
FIG. 1 is a schematic diagram of a ROADM networking mode.

WSS-based ROADM networking technology: the WSS-based ROADM networking technology can achieve flexible optical switching of any wavelength and any direction. This technology has become a key development direction for a wavelength division multiplexing network and gradually replaces a fixed optical add/drop multiplexer (FOADM) networking technology based on a power distribution unit (PDU) and an optical multiplex unit (OMU). By utilizing multi-dimensional WSS, ROADM can achieve functions such as add-drop, pass-through of optical signals in multiple directions. FIG. 1 is a schematic diagram of a common ROADM networking mode. The network utilizes 12 WSSs to achieve interoperability between any two directions of 2 add-drop directions and 4 line directions.

An embodiment of the present application relates to an optical fiber connection discovery method, applied to an electronic device, wherein the electronic device may be a terminal or a server. The electronic devices in this embodiment and the following embodiments will be explained using a server as an example. The following is a specific explanation of the implementation details of the optical fiber connection discovery method in this embodiment. The following content is only for the convenience of understanding the provided implementation details and is not necessary for implementing this solution.

Figure 2:
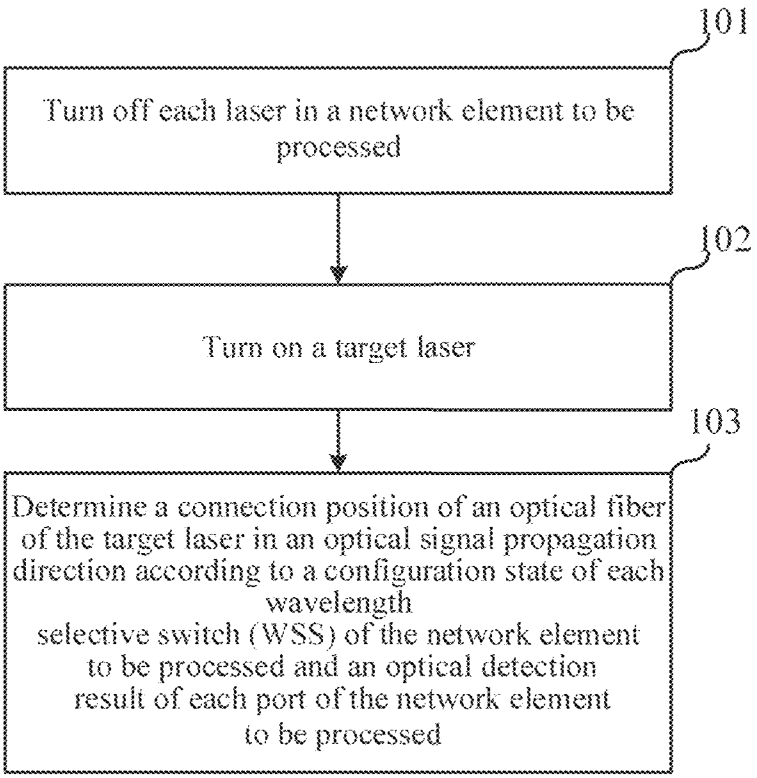
FIG. 2 is a flow diagram of an optical fiber connection discovery method according to an embodiment of the present application.

The specific flow of the optical fiber connection discovery method in this embodiment may be shown in FIG. 2, and includes:

At operation 101, each laser in a network element to be processed is turned off.

Specifically, when a server performs optical fiber connection discovery, all the lasers in the network element to be processed may be turned off first to ensure that there is no optical signal present in the network element to be processed. This can avoid the occurrence of a plurality of light sources in the network element to be processed in the process of optical fiber connection discovery and improve the accuracy of optical fiber connection discovery.

At operation 102, a target laser is turned on.

Specifically, when performing optical fiber connection discovery of the network element to be processed, the server may first determine the target laser in each laser of the network element to be processed and turn on one target laser. The laser of the network element to be processed includes an optical booster amplifier (OBA), an optical parametric amplifier (OPA), and an optical transform unit (OTU).

In the specific implementation, the server only turns on one target laser in the network element to be processed at a time. Considering that there are the plurality of lasers inside the network element to be processed, and light propagation paths of some lasers have overlapping points, as shown in FIG. 1, if all the WSSs are conductive, an optical signal emitted by the OBA in an add-drop direction 1 and an optical signal emitted by the OBA in an add-drop direction 2 can both be propagated to the WSS connected with the OBA in a line direction 2. If the plurality of target lasers are turned on at the same time, there will be a plurality of light sources in the network element to be processed, the optical signals in the network element to be processed are disordered, making it impossible to accurately discover an optical fiber connection position. However, the embodiment of the present application only turns on one laser at a time until all the fiber connection positions are discovered, which can further avoid the occurrence of the plurality of light sources inside the network element to be processed in a process of optical fiber connection discovery and improve the accuracy of optical fiber connection discovery.

In one example, the server may acquire specified information input by a user and determine the target laser in the network element to be processed according to the specified information.

In another example, the server may store a target laser selection rule in advance, and according to the selection rule, the lasers in the network element to be processed are sequentially taken as the target lasers.

In one example, the server may traverse each laser in the network element to be processed and sequentially takes each laser as the target laser. For example, the server may number each laser in the network element to be processed and sequentially take each laser as the target laser in an order of numbering.

In another example, the server may classify each laser in the network element to be processed, traverse all lasers under each category, and sequentially take each laser as the target laser. For example, the network element to be processed includes three types of lasers: OBA, OPA, and OTU. The server may first take each OBA as the target laser, then take each OPA as the target laser, and finally take each OTU as the target laser. The order of the three types of lasers of OBA, OPA, and OTU may be set by the skilled in the art according to actual needs, which is not specifically limited by the embodiment of the present application.

At operation 103, a connection position of an optical fiber of the target laser in an optical signal propagation direction is determined according to a configuration state of each wavelength selective switch (WSS) of the network element to be processed and an optical detection result of each port of the network element to be processed.

Specifically, after turning on the target laser, the server may determine the connection position of the optical fiber of the target laser in the optical signal propagation direction according to the configuration state of each WSS of the network element to be processed and the optical detection result of each port of the network element to be processed. Considering that in an actual networking process, the optical fiber connection position may only be determined manually, resulting in high operation and maintenance pressure and high operation and maintenance cost, the embodiment of the present application quickly and accurately discovers the connection position of the optical fiber of the target laser in the optical signal propagation direction automatically in a mode of automatically turning on the laser and taking into account the configuration state of each WSS in the network element and the optical detection result of each port in the network element, so that the optical fiber connection positions of physical fiber connection of the entire network element are automatically discovered, thereby greatly alleviating the operation and maintenance pressures, reducing the operation and maintenance costs, and improving the operation and maintenance efficiency.

In the specific implementation, the configuration state of the WSS includes a null state and a cross configuration state.

A WSS with the configuration state being the null state refers to a non-conductive WSS, and a WSS with the configuration state being the cross configuration state refers to a conductive WSS.

In the specific implementation, after determining the connection position of the optical fiber of the target laser in the optical signal propagation direction, the server may turn off the target laser, turn on the next target laser, and determine the connection position of the optical fiber of the target laser in the optical signal propagation direction until the connection positions of all the optical fibers in the network element to be processed are discovered.

In this embodiment, each laser in the network element to be processed is turned off, one target laser is turned on, and the connection position of the optical fiber of the target laser in the optical signal propagation direction is determined according to the configuration state of each wavelength selective switch (WSS) of the network element to be processed and the optical detection result of each port of the network element to be processed. Considering that in the actual networking process, a service unit that sends and receives specific messages need to be connected to a network after fiber connection, which results in the inability to send the specific messages between ports and the inability to achieve automatic discovery of the optical fiber, therefore, the optical fiber connection position can only be determined manually, resulting in high operation and maintenance pressure and high operation and maintenance cost. The embodiment of the present application quickly and accurately discovers the connection position of the optical fiber of the target laser in the optical signal propagation direction automatically in a mode of automatically turning on one target laser and taking into account the configuration state of each WSS in the network element and the optical detection result of each port in the network element, so that the optical fiber connection positions of physical fiber connection of the entire network element are automatically discovered, thereby greatly alleviating the operation and maintenance pressures, reducing the operation and maintenance costs, and improving the operation and maintenance efficiency. At the same time, turning on only one target laser at a time can also avoid the occurrence of the plurality of light sources in the network element to be processed in the process of optical fiber connection discovery, thereby improving the accuracy of optical fiber connection discovery.

Figure 3:
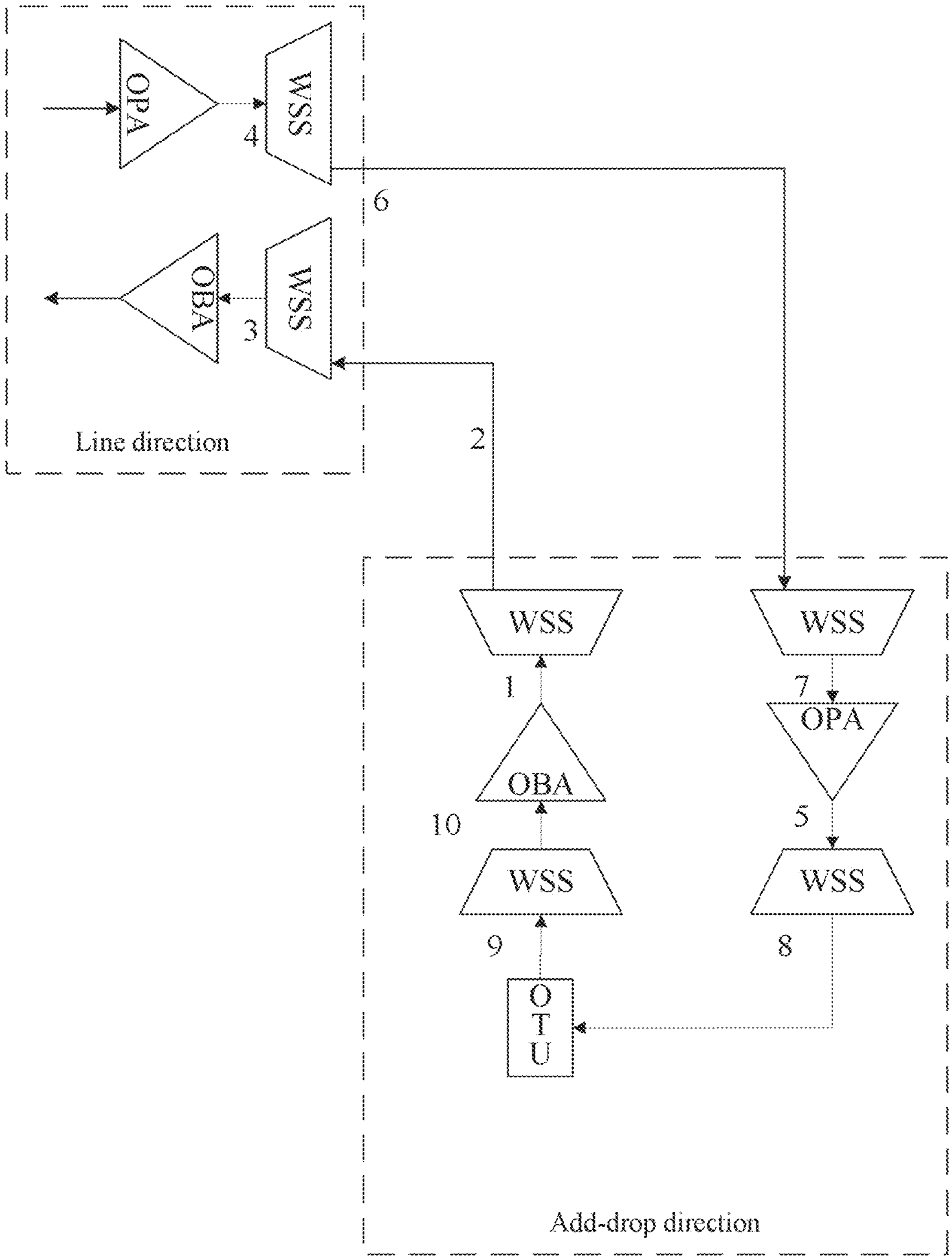
FIG. 3 is a flow diagram for determining a connection position of an optical fiber of an OBA in an optical signal propagation direction according to another embodiment of the present application.

In one embodiment, the target laser is the OBA, and determining the connection position of the optical fiber of the OBA in the optical signal propagation direction may be achieved by each sub steps as shown in FIG. 3, and specifically includes:

At operation 201, the configuration state of each WSS of the network element to be processed is set as null.

Specifically, after the server determines that the target laser is the OBA, the configuration state of each WSS of the network element to be processed may be set as null, thereby ensuring that all WSSs of the network element to be processed are not conductive and that optical signals will not be transmitted to boards in other directions.

At operation 202, each laser in the network element to be processed is turned off, and the OBA is turned on.

In the specific implementation, after setting the configuration state of each WSS of the network element to be processed as null, the server may turn off each laser in the network element to be processed, and turn on one target laser, that is, turn on the OBA, so that an optical signal of the OBA is transmitted.

In one example, the server may also turn off each laser in the network element to be processed first, and then set the configuration state of each WSS in the network element to be processed as null.

At operation 203, whether any WSS detects light at a group port is judged, if yes, operation 204 is performed, and otherwise, operation 212 is performed.

Specifically, after turning on the OBA, the server may acquire the optical detection result of each WSS and judge whether any WSS detects the light at the group port.

Figure 4:
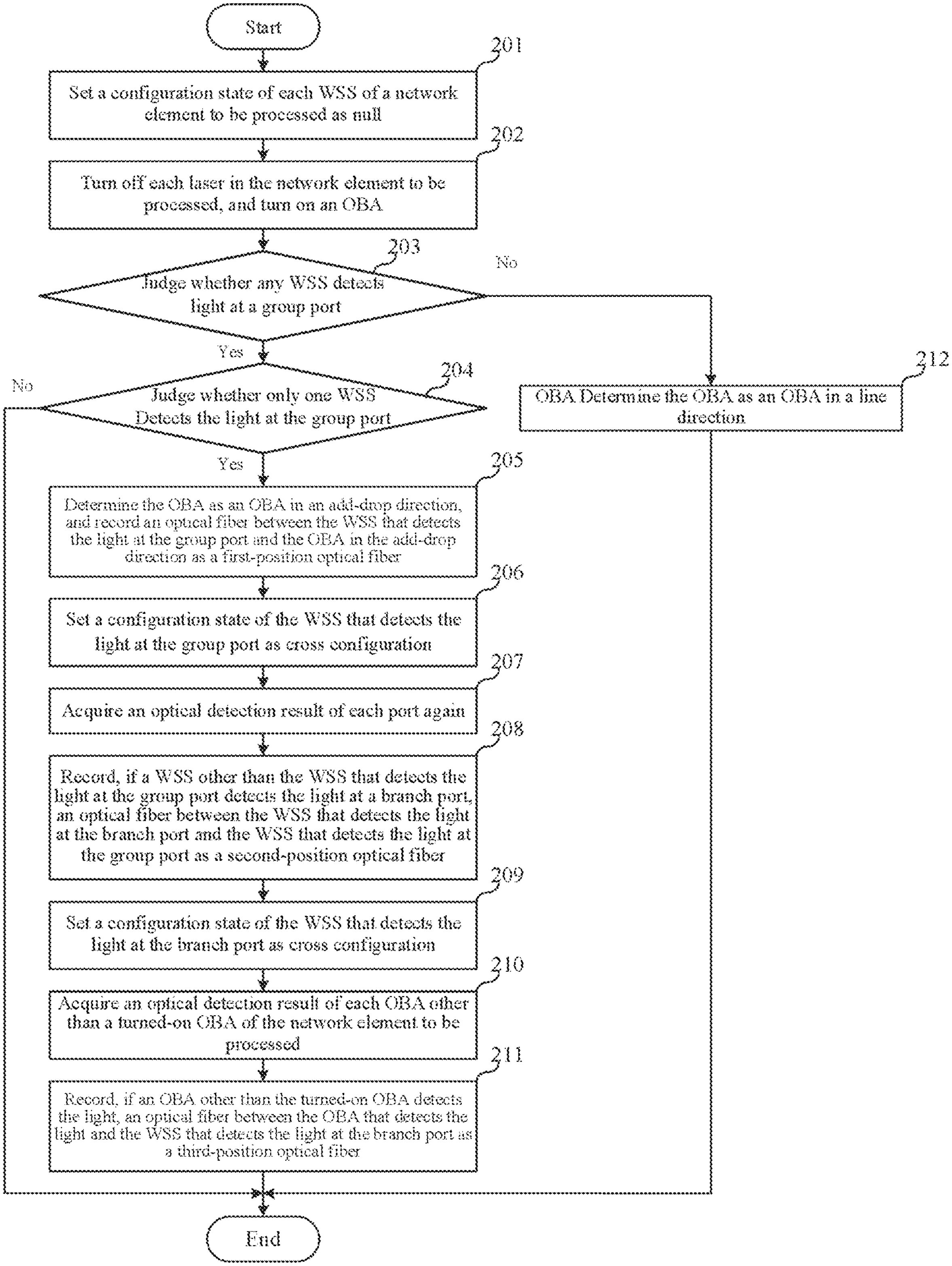
FIG. 4 is a schematic diagram of an optical fiber connection position provided according to another embodiment of the present application.

In the specific implementation, because the server sets the configuration state of each WSS as null in operation 201, it is not conductive between various directions, as shown in FIG. 4. If the physical fiber connection is correct, it may be that all the WSSs cannot detect the light, or only a WSS with the group port connected with the OBA can detect the light on its own group port.

At operation 204, whether only one WSS detects the light at the group port is judged, if yes, operation 205 is performed, and otherwise, the process ends.

In the specific implementation, the server may continue to judge whether only one WSS detects the light at the group port after judging that there is the WSS that detects the light at the group port. If only one WSS detects the light at the group port, it indicates that the physical fiber connection is correct and the optical fiber connection discovery process continues. If the plurality of WSSs detect the light at the group port, it indicates that the physical fiber connection is incorrect and the optical fiber connection position cannot be continued to discover correctly, and the server may directly exit the optical fiber connection discovery process.

In one example, if the plurality of WSSs detect the light at the group port, the server may generate physical fiber connection error indication, so as to inform staff to modify the physical fiber connection or perform the physical fiber connection again.

At operation 205, the OBA is determined as an OBA in an add-drop direction, and an optical fiber between the WSS that detects the light at the group port and the OBA in the add-drop direction is recorded as a first-position optical fiber.

In the specific implementation, as shown in FIG. 4, the server cannot determine whether the OBA is the OBA in the add-drop direction or an OBA in a line direction when turning on the OBA. If the server turns on the OBA and discovers that only one WSS detects the light at the group port, the turned-on OBA may be determined as the OBA in the add-drop direction, and the optical fiber between the WSS that detects the light at the group port and the OBA in the add-drop direction is recorded as the first-position optical fiber.

Figure 5:
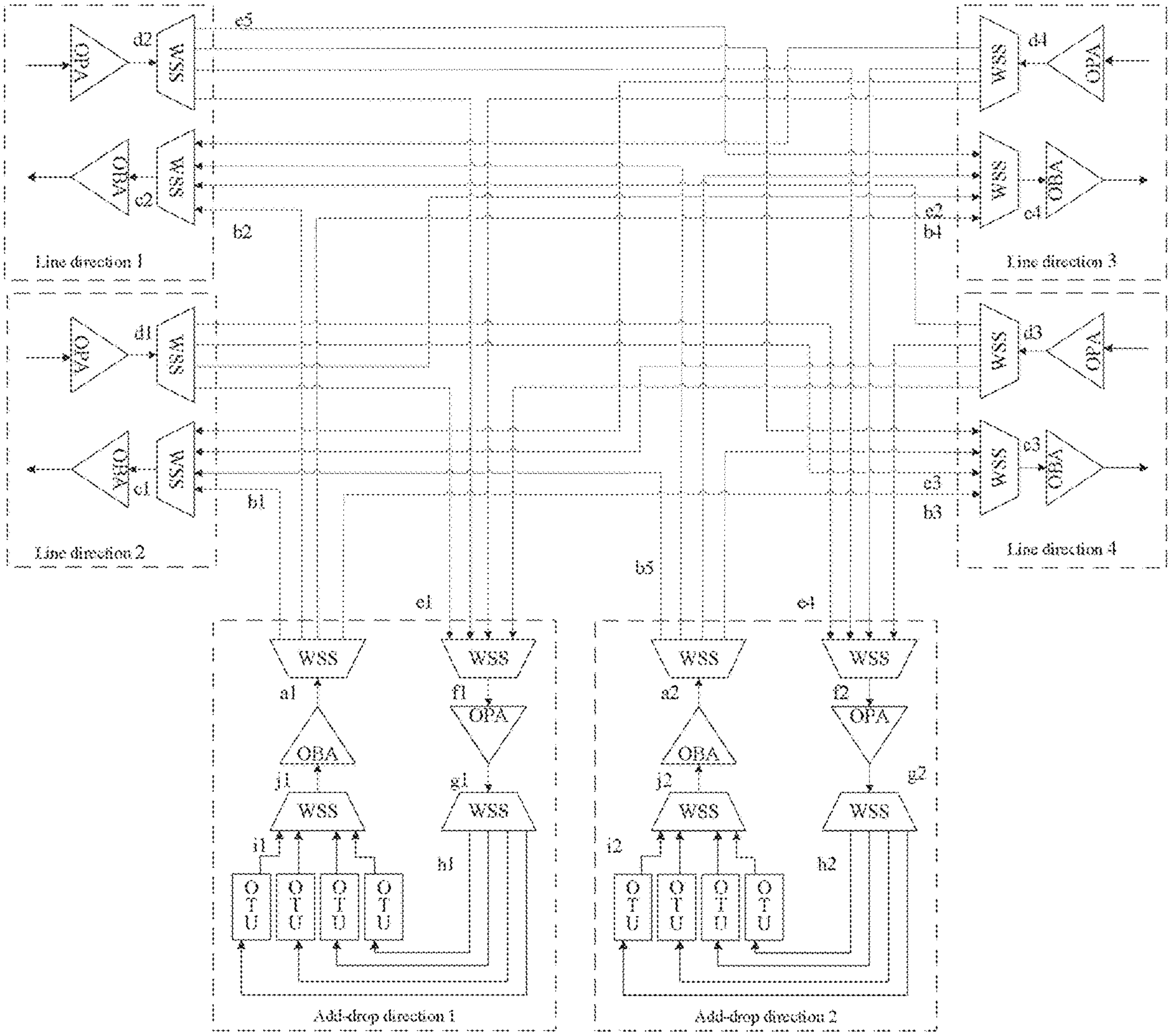
FIG. 5 is a schematic diagram of another optical fiber connection position provided according to another embodiment of the present application.

In one example, as shown in FIG. 5, both an a1 optical fiber and an a2 optical fiber are the first-position optical fibers.

At operation 206, the configuration state of the WSS that detects the light at the group port is set as cross configuration.

In the specific implementation, the configuration state of the WSS that detects the light at the group port is set as cross configuration, that is, the WSS is subjected to cross configuration to each branch port, so as to conduct the WSS. After determining the OBA as the OBA in the add-drop direction and recording the optical fiber between the WSS that detects the light at the group port and the OBA in the add-drop direction as the first-position optical fiber, the server may set the configuration state of the WSS that detects the light at the group port as cross configuration, that is, the WSS is conductive to ensure that the optical signal of the OBA in the add-drop direction is transmitted to each line direction of the network element to be processed.

In an example, as shown in FIG. 4, the first-position optical fiber has been determined, and the server will then set the configuration state of the WSS connected to the first-position optical fiber as cross configuration.

At operation 207, the optical detection result of each port is acquired again.

In the specific implementation, after setting the configuration state of the WSS that detects the light at the group port as cross configuration, the server may acquire the optical detection result of each port again to clarify the transmission direction of the optical signal of the OBA in the add-drop direction. Each port includes a branch port of each WSS.

At operation 208, if a WSS other than the WSS that detects the light at the group port detects the light at the branch port, an optical fiber between the WSS that detects the light at the branch port and the WSS that detects the light at the group port is recorded as a second-position optical fiber.

In the specific implementation, as shown in FIG. 4, after acquiring the optical detection result of each port again, if it is detected that the WSS other than the WSS that detects the light at the group port detects the light at the branch port, the server records the optical fiber between the WSS that detects the light at the branch port and the WSS that detects the light at the group port as the second-position optical fiber. After the WSS that detects the light at the group port is conductive, it will inevitably detects the light at the branch port, and the server does not need to consider the WSS, only needs to consider whether other WSSs besides this WSS detect the light.

In one example, as shown in FIG. 5, a b1 optical fiber, a b2 optical fiber, a b3 optical fiber, a b4 optical fiber and a b5 optical fiber are all the second-position optical fibers. The server may further continue to subdivide the second-position optical fibers according to a label of each WSS.

At operation 209, the configuration state of the WSS that detects the light at the branch port is set as cross configuration.

In the specific implementation, the configuration state of the WSS that detects the light at the branch port is set as cross configuration, that is, the WSS is conductive. After recording the optical fiber between the WSS that detects the light at the branch port and the WSS that detects the light at the group port as the second-position optical fiber, the server may set the configuration state of the WSS that detects the light at the branch port as cross configuration, so as to ensure that the optical signal of the OBA in the add-drop direction is transmitted to each line direction of the network element to be processed.

At operation 210, an optical detection result of each OBA other than a turned-on OBA of the network element to be processed is acquired.

Specifically, after setting the configuration state of the WSS that detects the light at the branch port as cross configuration, the server may acquire the optical detection result of each OBA other than the turned-on OBA of the network element to be processed to clarify whether the optical signal of the OBA in the add-drop direction is transmitted to the line direction.

At operation 211, if an OBA other than the turned-on OBA detects the light, an optical fiber between the OBA that detects the light and the WSS that detects the light at the branch port is recorded as a third-position optical fiber.

In the specific implementation, as shown in FIG. 4, after acquiring the optical detection result of each OBA other than the turned-on OBA of the network element to be processed, if it is detected that the OBA other than the turned-on OBA detects the light, the server records the optical fiber between the OBA that detects the light and the WSS that detects the light at the branch port as the third-position optical fiber.

In one example, as shown in FIG. 5, a c1 optical fiber, a c2 optical fiber, a c3 optical fiber, and a c4 optical fiber are all the third-position optical fibers.

At operation 212, the OBA is determined as the OBA in the line direction.

In the specific implementation, if the server judges that each WSS in the network element to be processed does not detect the light at the group port, it indicates that there is no optical signal transmission within the network element to be processed, and therefore, the OBA turned-on by the server is the OBA in the line direction. After determining all the optical fiber connection positions in the network element to be processed, the server may further determine that a downstream optical fiber of the OBA in the line direction is an optical fiber between the network elements.

This embodiment can automatically distinguish the OBA in the line direction and the OBA in the add-drop direction, and effectively improve the efficiency and accuracy of the connection position of the optical fiber of the OBA in the optical signal propagation direction.

Figure 6:
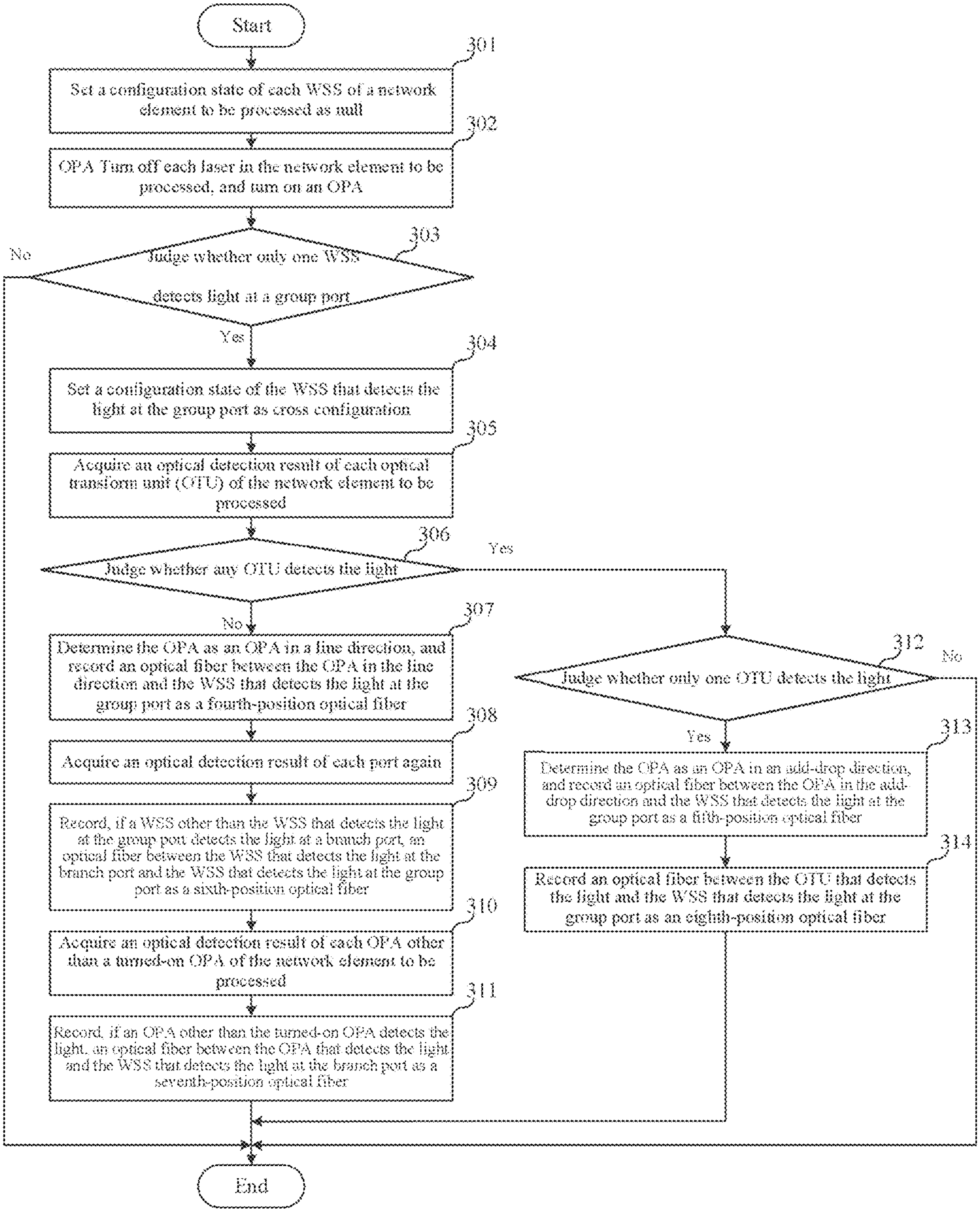
FIG. 6 is a flow diagram for determining a connection position of an optical fiber of an OPA in an optical signal propagation direction according to another embodiment of the present application.

In one embodiment, the target laser is the OPA, and determining the connection position of the optical fiber of the OPA in the optical signal propagation direction may be achieved by each sub steps as shown in FIG. 6, and specifically includes:

At operation 301, the configuration state of each WSS of the network element to be processed is set as null.

Specifically, after the server determines that the target laser is the OPA, the configuration state of each WSS of the network element to be processed may be set as null, thereby ensuring that all WSSs of the network element to be processed are not conductive and that optical signals will not be transmitted to boards in other directions.

At operation 302, each laser in the network element to be processed is turned off, and the OPA is turned on.

In the specific implementation, after setting the configuration state of each WSS of the network element to be processed as null, the server may turn off each laser in the network element to be processed, and turn on one target laser, that is, turn on the OPA, so that an optical signal of the OPA is transmitted.

In one example, the server may also turn off each laser in the network element to be processed first, and then set the configuration state of each WSS in the network element to be processed as null.

At operation 303, whether only one WSS detects the light at the group port is judged, if yes, operation 304 is performed, and otherwise, the process directly ends.

Specifically, after turning on the OPA, the server may judge whether only one WSS detects the light at the group port.

In the specific implementation, because the server sets the configuration state of each WSS as null in operation 301, it is not conductive between various directions, as shown in FIG. 4, if the physical fiber connection is correct, only a WSS with the group port connected with the OPA can detect the light on its own group port.

At operation 304, the configuration state of the WSS that detects the light at the group port is set as cross configuration.

Specifically, after judging that only one WSS detects the light at the group port, the server may set the configuration state of the WSS that detects the light at the group port as cross configuration, so as to ensure that the optical signal of the turned-on OBA may be transmitted to each direction of the network element to be processed.

In one example, if the server judges that all the WSSs do not detect the light at the group ports, or that more than one WSS does not detect the light at the group port, it indicates a physical fiber connection error and the server may exit the optical fiber connection discovery process.

At operation 305, an optical detection result of each optical transform unit (OTU) of the network element to be processed is acquired.

In the specific implementation, after setting the configuration state of the WSS that detects the light at the group port as cross configuration, the server may acquire the optical detection result of each optical transform unit (OTU) of the network element to be processed to clarify whether the turned-on OPA is an OPA in an add-drop direction or an OPA in a line direction.

At operation 306, whether any OTU detects the light is judged, if yes, operation 312 is performed, and otherwise, operation 307 is performed.

Specifically, after acquiring the optical detection result of each optical transform unit (OTU) of the network element to be processed, the server may judge whether any OTU detects the light.

At operation 307, the OPA is determined as the OPA in the line direction, and an optical fiber between the OPA in the line direction and the WSS that detects the light at the group port as a fourth-position optical fiber.

In the specific implementation, as shown in FIG. 4, if the server judges that no OTU detects the light, it is determined that the turned-on OPA is the OPA in the line direction, and the optical fiber between the OPA in the line direction and the WSS that detects the light at the group port as the fourth-position optical fiber.

In one example, as shown in FIG. 5, a d1 optical fiber, a d2 optical fiber, a d3 optical fiber, and a d4 optical fiber are all the fourth-position optical fibers.

At operation 308, the optical detection result of each port is acquired again.

In the specific implementation, after determining that the OPA is the OPA in the line direction, and recording the optical fiber between the OPA in the line direction and the WSS that detects the light at the group port as the fourth-position optical fiber, the server may acquire the optical detection result of each port again, so as to clarify the transmission direction of the optical signal of the OPA in the line direction. Each port includes the branch port of each WSS.

At operation 309, if a WSS other than the WSS that detects the light at the group port detects the light at the branch port, an optical fiber between the WSS that detects the light at the branch port and the WSS that detects the light at the group port is recorded as a sixth-position optical fiber.

In the specific implementation, as shown in FIG. 4, after acquiring the optical detection result of each port again, if it is detected that the WSS other than the WSS that detects the light at the group port detects the light at the branch port, the server records the optical fiber between the WSS that detects the light at the branch port and the WSS that detects the light at the group port as the sixth-position optical fiber. After the WSS that detects the light at the group port is conductive, it will inevitably detects the light at the branch port, and the server does not need to consider the WSS, only needs to consider whether other WSSs besides this WSS detects the light.

In one example, as shown in FIG. 5, an e1 optical fiber, an e2 optical fiber, an e3 optical fiber, an e4 optical fiber and an e5 optical fiber are all the sixth-position optical fibers. The server may further continue to subdivide the sixth-position optical fibers according to a label of each WSS At operation 310, an optical detection result of each OPA other than a turned-on OPA of the network element to be processed is acquired.

Specifically, after recording the optical fiber between the WSS that detects the light at the branch port and the WSS that detects the light at the group port as the sixth-position optical fiber, the server may acquire the optical detection result of each OPA other than the turned-on OPA of the network element to be processed to clarify whether the optical signal of the OBA in the line direction is transmitted to the add-drop direction.

At operation 311, if an OPA other than the turned-on OPA detects the light, an optical fiber between the OPA that detects the light and the WSS that detects the light at the branch port is recorded as a seventh-position optical fiber.

In the specific implementation, as shown in FIG. 4, after acquiring the optical detection result of each OPA other than the turned-on OPA of the network element to be processed, if it is detected that the OPA other than the turned-on OPA detects the light, the server records the optical fiber between the OPA that detects the light and the WSS that detects the light at the branch port as the seventh-position optical fiber.

In one example, as shown in FIG. 5, both an f1 optical fiber and an f2 optical fiber are the seventh-position optical fibers.

At operation 312, whether only one OTU detects the light is judged, if yes, operation 313 is performed, and otherwise, the process directly ends.

Specifically, the server may continue to judge whether only one OTU detects the light after judging that there is the OTU that detects the light. If only one OTU detects the light, it indicates that the physical fiber connection is correct and the optical fiber connection discovery process continues. If the plurality of OTUs detect the light, it indicates that the physical fiber connection is incorrect and the optical fiber connection position cannot be continued to discover correctly, and the server may directly exit the optical fiber connection discovery process.

At operation 313, the OPA is determined as the OPA in the add-drop direction, and an optical fiber between the OPA in the add-drop direction and the WSS that detects the light at the group port as a fifth-position optical fiber.

In the specific implementation, as shown in FIG. 4, the server cannot determine whether the OPA is the OPA in the add-drop direction or an OPA in a line direction when turning on the OPA. If the server turns on the OPA and discovers that only one OTU detects the light, the turned-on OPA may be determined as the OBA in the add-drop direction, and the optical fiber between the WSS that detects the light at the group port and the OPA in the add-drop direction is recorded as the fifth-position optical fiber.

In one example, as shown in FIG. 5, both a g1 optical fiber and a g2 optical fiber are the fifth-position optical fibers.

At operation 314, an optical fiber between the OTU that detects the light and the WSS that detects the light at the group port as an eighth-position optical fiber.

Specifically, after determining the OPA as the OPA in the add-drop direction, and the optical fiber between the OPA in the add-drop direction and the WSS that detects the light at the group port as the fifth-position optical fiber, the server may further record the optical fiber between the OTU that detects the light and the WSS that detects the light at the group port as the eighth-position optical fiber.

In one example, as shown in FIG. 5, both an h1 optical fiber and an h2 optical fiber are the eighth-position optical fibers.

This embodiment can automatically distinguish the OPA in the line direction from the OPA in the add-drop direction, and effectively improve the efficiency and accuracy of the connection position of the optical fiber of the OPA in the optical signal propagation direction.

Figure 7:
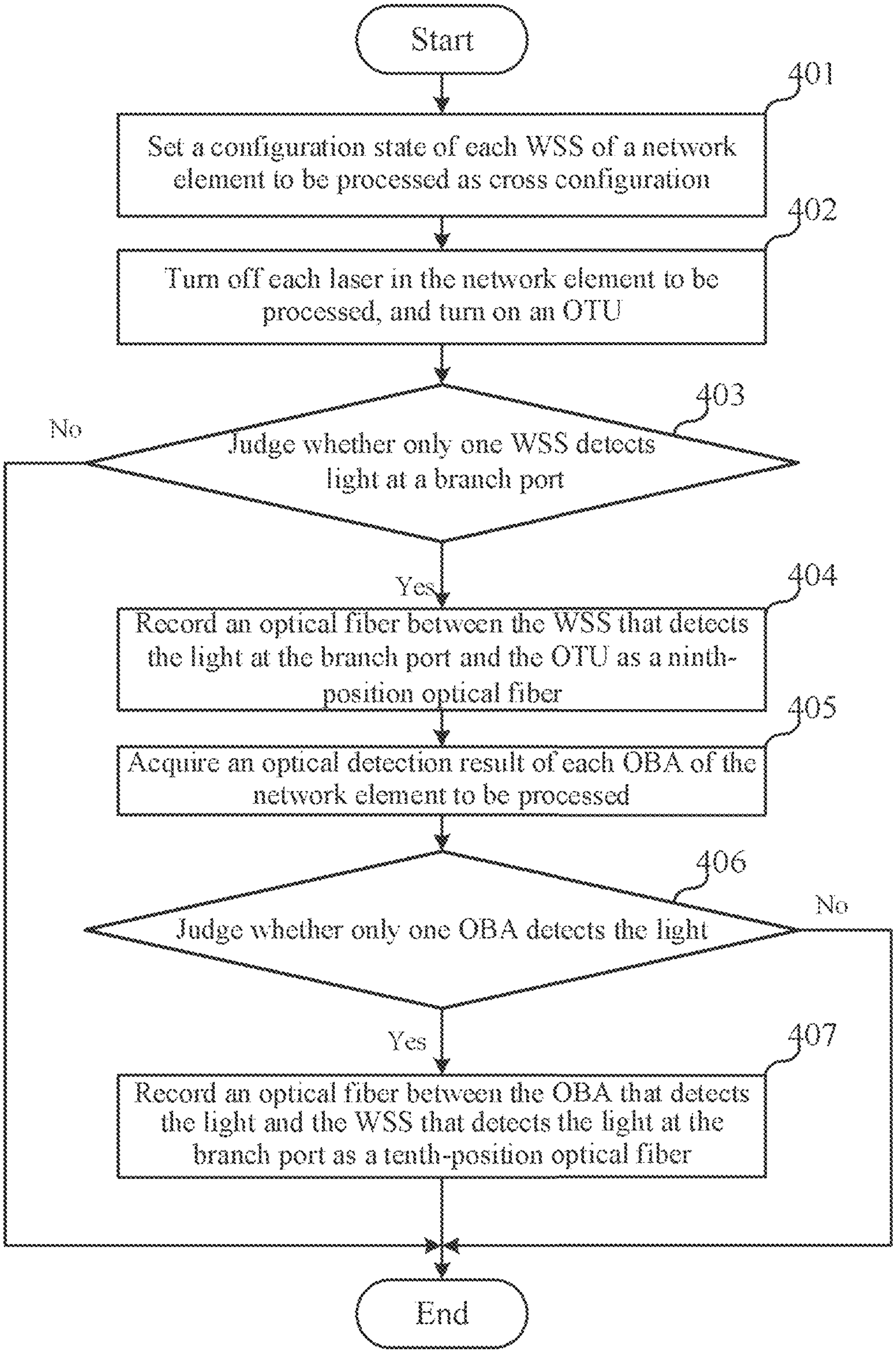
FIG. 7 is a flow diagram for determining a connection position of an optical fiber of an OTU in an optical signal propagation direction according to another embodiment of the present application.

In one embodiment, the target laser is the OTU, and determining the connection position of the optical fiber of the OTU in the optical signal propagation direction may be achieved by each sub steps as shown in FIG. 7, and specifically includes:

At operation 401, the configuration state of each WSS of the network element to be processed is set as cross configuration.

Specifically, after determining that the target laser is the OTU, the server may set the configuration state of each WSS of the network element to be processed as cross configuration, thereby ensuring that all WSSs of the network element to be processed are conductive. The OTU only exists within the line direction, and the configuration state of each WSS is set as cross configuration, thus the transmission direction of the optical signal of the OTU can be accurately discovered.

At operation 402, each laser in the network element to be processed is turned off, and the OTU is turned on.

In the specific implementation, after setting the configuration state of each WSS of the network element to be processed as cross configuration, the server may turn off each laser in the network element to be processed, and turn on one target laser, that is, turn on the OTU, so that an optical signal of the OTU is transmitted.

In one example, the server may also turn off each laser in the network element to be processed first, and then set the configuration state of each WSS in the network element to be processed as null.

At operation 403, whether only one WSS detects the light at the branch port is judged, if yes, operation 404 is performed, and otherwise, the process directly ends.

Specifically, after turning on the OTU, the server may judge whether only one WSS detects the light at the branch port.

In the specific implementation, because the OTU only exists inside the add-drop direction, even if the OTU is turned on, the optical signal will not be transmitted to the line direction, as shown in FIG. 4, if the physical fiber connection is correct, only the WSS with the branch port connected with the OTU can detect the light at its own branch port.

In one example, if the server judges that all the WSSs do not detect the light at the branch ports, it indicates a physical fiber connection error and the server may exit the optical fiber connection discovery process.

At operation 404, an optical fiber between the WSS that detects the light at the branch port and the OTU is recorded as a ninth-position optical fiber.

In the specific implementation, as shown in FIG. 4, if the server judges that only one WSS detects the light at the branch port, the server may record the optical fiber between the WSS that detects the light at the branch port and the OTU as the ninth-position optical fiber.

In one example, as shown in FIG. 5, both an i1 optical fiber and an i2 optical fiber are the ninth-position optical fibers.

At operation 405, an optical detection result of each OBA of the network element to be processed is acquired.

Specifically, after recording the optical fiber between the WSS that detects the light at the branch port and the OTU as the ninth-position optical fiber, the server may acquire the optical detection result of each OBA of the network element to be processed to clarify the transmission direction of the optical signal of the OTU.

At operation 406, whether only one OBA detects the light is judged, if yes, operation 407 is performed, and otherwise, the process directly ends.

In one example, if the server judges that all the OBAs do not detect the light, it indicates a physical fiber connection error and the server may exit the optical fiber connection discovery process.

At operation 407, an optical fiber between the OBA that detects the light and the WSS that detects the light at the branch port as a tenth-position optical fiber.

In the specific implementation, as shown in FIG. 4, after judging that only one OBA detects the light, the server may record the optical fiber between the OBA that detects the light and the WSS that detects the light at the branch port as the tenth-position optical fiber.

In one example, as shown in FIG. 5, both a j1 optical fiber and a j2 optical fiber are the tenth-position optical fibers.

This embodiment can effectively improve the efficiency and accuracy of the connection position of the optical fiber of the OTU in the optical signal propagation direction.

Figure 8:
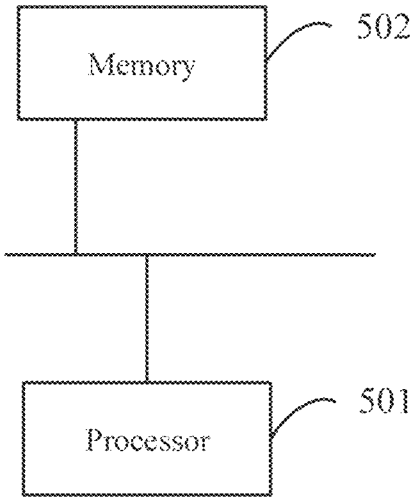
FIG. 8 is a schematic structural diagram of an electronic device according to another embodiment of the present application.

Another embodiment of the present application relates to an electronic device, as shown in FIG. 8, including: at least one processor 501; and a memory 502 in communication connection with the at least one processor 501, wherein the memory 502 stores instructions executable by the at least one processor 501, and the instructions are executed by the at least one processor 501, so that the at least one processor 501 can execute the optical fiber connection discovery method in the above embodiments.

The memory and the processor are connected through a bus, the bus may include any number of interconnected buses and bridges, and the bus connects one or more processors and various circuits of the memory together. The bus may further connect various other circuits such as a peripheral device, a voltage stabilizer and a power management circuit together, which are publicly known in the art and therefore are not further described herein. A bus interface provides an interface between the bus and a transceiver. The transceiver may be one or more elements, such as a plurality of receivers and transmitters, providing a unit for communicating with various other apparatus over a transmission medium. Data processed by the processor is transmitted on a wireless medium through an antenna, and the antenna further receives the data and transfers the data to the processor.

The processor is responsible for managing the bus and general processing, and may further provide various functions, including timing, peripheral interfaces, voltage regulation, power management, and other control functions. The memory may be used for storing the data used by the processor during operation performing.

Another embodiment of the present application relates to a computer readable storage medium, storing a computer program. The computer program, when executed by a processor, implements the method embodiment above.

That is, those skilled in the art can understand that all or part of the steps in the above embodiments can be implemented by instructing the relevant hardware through a program, the program is stored in a storage medium and includes several instructions to enable a device (such as a single-chip computer, and a chip) or a processor to execute all or part of the steps of the methods described in the various embodiments of the present application. The aforementioned storage medium includes: a U disk, a mobile hard disk, a read-only memory (ROM), a random access memory (RAM), a magnetic disk or an optical disk and other media that can store program codes.

The ordinarily skilled in the art can understand that the above embodiments are specific embodiments for implementing the present application, and in practical applications, various changes can be made in form and details without deviating from the spirit and scope of the present application.

What is claimed is:

1. An optical fiber connection discovery method, comprising:

turning off each laser in a network element to be processed;

turning on a target laser;

determining a connection position of an optical fiber of the target laser in an optical signal propagation direction according to a configuration state of each wavelength selective switch (WSS) of the network element to be processed and an optical detection result of each port of the network element to be processed; and acquiring the optical detection result of each WSS to judge whether any WSS detects a light at a group port, wherein under the condition that the target laser is an optical booster amplifier (OBA), before turning on the target laser, the method further comprises:

setting the configuration state of each WSS of the network element to be processed as null; and determining the connection position of the optical fiber of the target laser in the optical signal propagation direction according to the configuration state of each wavelength selective switch (WSS) of the network element to be processed and the optical detection result of each port of the network element to be processed comprises:

determining, under the condition that only one WSS detects light at a group port, the OBA as an OBA in an add-drop direction, and recording an optical fiber between the WSS that detects the light at the group port and the OBA in the add-drop direction as a first-position optical fiber;

under the condition that the target laser is an optical parametric amplifier (OPA), before turning on the target laser, the method further comprises:

setting the configuration state of each WSS of the network element to be processed as null; and determining the connection position of the optical fiber of the target laser in the optical signal propagation direction according to the configuration state of each wavelength selective switch (WSS) of the network element to be processed and the optical detection result of each port of the network element to be processed comprises:

setting, under the condition that only one WSS detects light at a group port, a configuration state of the WSS that detects the light at the group port as cross configuration;

acquiring an optical detection result of each optical transform unit (OTU) of the network element to be processed;

determining, under the condition that no OTU detects the light, the OPA as an OPA in a line direction, and recording an optical fiber between the OPA in the line direction and the WSS that detects the light at the group port as a fourth-position optical fiber; and determining, under the condition that only one OTU detects the light, the OPA as an OPA in an add-drop direction, and recording an optical fiber between the OPA in the add-drop direction and the WSS that detects the light at the group port as a fifth-position optical fiber:

under the condition that the target laser is an OTU, before turning on the target laser, the method further comprises:

setting the configuration state of each WSS of the network element to be processed as cross configuration; and determining the connection position of the optical fiber of the target laser in the optical signal propagation direction according to the configuration state of each wavelength selective switch (WSS) of the network element to be processed and the optical detection result of each port of the network element to be processed comprises:

recording, under the condition that only one WSS detects the light at the branch port, an optical fiber between the WSS that detects the light at the branch port and the OTU as a ninth-position optical fiber.

2. The optical fiber connection discovery method according to claim 1, wherein after recording the optical fiber between the WSS that detects the light at the group port and the OBA in the add-drop direction as the first-position optical fiber, the method further comprises:

setting a configuration state of the WSS detecting the light at the group port as cross configuration;

acquiring the optical detection result of each port again; and recording, under the condition that a WSS other than the WSS that detects the light at the group port detects light at a branch port, an optical fiber between the WSS that detects the light at the branch port and the WSS that detects the light at the group port as a second-position optical fiber.

3. The optical fiber connection discovery method according to claim 2, wherein after recording the optical fiber between the WSS that detects the light at the branch port and the WSS that detects the light at the group port as the second-position optical fiber, the method further comprises:

setting a configuration state of the WSS detecting the light at the branch port as cross configuration;

acquiring an optical detection result of each OBA other than a turned-on OBA of the network element to be processed; and recording, under the condition that an OBA other than the turned-on OBA detects the light, an optical fiber between the OBA that detects the light and the WSS that detects the light at the branch port as a third-position optical fiber.

4. The optical fiber connection discovery method according to claim 1, wherein after recording the optical fiber between the OPA in the line direction and the WSS that detects the light at the group port as the fourth-position optical fiber, the method further comprises:

acquiring the optical detection result of each port again; and recording, under the condition that a WSS other than the WSS that detects the light at the group port detects the light at a branch port, an optical fiber between the WSS that detects the light at the branch port and the WSS that detects the light at the group port as a sixth-position optical fiber.

5. The optical fiber connection discovery method according to claim 4, wherein after recording the optical fiber between the WSS that detects the light at the branch port and the WSS that detects the light at the group port as the sixth-position optical fiber, the method further comprises:

acquiring an optical detection result of each OPA other than a turned-on OPA in the network element to be processed; and recording, under the condition that an OPA other than the turned-on OPA detects the light, an optical fiber between the OPA that detects the light and the WSS that detects the light at the branch port as a seventh-position optical fiber.

6. The optical fiber connection discovery method according to claim 1, wherein after recording the optical fiber between the OPA in the add-drop direction and the WSS that detects the light at the group port as the fifth-position optical fiber, the method further comprises:

recording an optical fiber between the OTU that detects the light and the WSS that detects the light at the group port as an eighth-position optical fiber.

7. The optical fiber connection discovery method according to claim 1, wherein after recording the optical fiber between the WSS that detects the light at the branch port and the OTU as the ninth-position optical fiber, the method further comprises:

acquiring an optical detection result of each OBA of the network element to be processed; and recording, under the condition that only one OBA detects the light, an optical fiber between the OBA and the WSS that detects the light at the branch port as a tenth-position optical fiber.

8. The optical fiber connection discovery method according to claim 1, wherein determining the connection position of the optical fiber of the target laser in the optical signal propagation direction according to the configuration state of each wavelength selective switch (WSS) of the network element to be processed and the optical detection result of each port of the network element to be processed further comprises:

determining, under the condition that no light is detected at each port, the OBA as an OBA in a line direction.

9. An electronic device, comprising:

at least one processor; and a memory in communication connection with the at least one processor, wherein the memory stores instructions executable by the at least one processor, and the instructions are executed by the at least one processor, such that the at least one processor is able to execute an optical fiber connection discovery method comprising:

turning off each laser in a network element to be processed;

turning on a target laser;

determining a connection position of an optical fiber of the target laser in an optical signal propagation direction according to a configuration state of each wavelength selective switch (WSS) of the network element to be processed and an optical detection result of each port of the network element to be processed; and acquiring the optical detection result of each WSS to judge whether any WSS detects a light at a group port, wherein under the condition that the target laser is an optical booster amplifier (OBA), before turning on the target laser, the method further comprises:

setting the configuration state of each WSS of the network element to be processed as null; and determining the connection position of the optical fiber of the target laser in the optical signal propagation direction according to the configuration state of each wavelength selective switch (WSS) of the network element to be processed and the optical detection result of each port of the network element to be processed comprises:

determining, under the condition that only one WSS detects light at a group port, the OBA as an OBA in an add-drop direction, and recording an optical fiber between the WSS that detects the light at the group port and the OBA in the add-drop direction as a first-position optical fiber;

under the condition that the target laser is an optical parametric amplifier (OPA), before turning on the target laser, the method further comprises:

setting the configuration state of each WSS of the network element to be processed as null; and determining the connection position of the optical fiber of the target laser in the optical signal propagation direction according to the configuration state of each wavelength selective switch (WSS) of the network element to be processed and the optical detection result of each port of the network element to be processed comprises:

setting, under the condition that only one WSS detects light at a group port, a configuration state of the WSS that detects the light at the group port as cross configuration:

acquiring an optical detection result of each optical transform unit (OTU) of the network element to be processed;

determining, under the condition that no OTU detects the light, the OPA as an OPA in a line direction, and recording an optical fiber between the OPA in the line direction and the WSS that detects the light at the group port as a fourth-position optical fiber; and determining, under the condition that only one OTU detects the light, the OPA as an OPA in an add-drop direction, and recording an optical fiber between the OPA in the add-drop direction and the WSS that detects the light at the group port as a fifth-position optical fiber;

under the condition that the target laser is an OTU, before turning on the target laser, the method further comprises:

setting the configuration state of each WSS of the network element to be processed as cross configuration; and determining the connection position of the optical fiber of the target laser in the optical signal propagation direction according to the configuration state of each wavelength selective switch (WSS) of the network element to be processed and the optical detection result of each port of the network element to be processed comprises:

recording, under the condition that only one WSS detects the light at the branch port, an optical fiber between the WSS that detects the light at the branch port and the OTU as a ninth-position optical fiber.

10. A computer readable storage medium, storing a computer program, wherein the computer program, when executed by a processor, implements an optical fiber connection discovery method comprising:

turning off each laser in a network element to be processed;

turning on a target laser;

determining a connection position of an optical fiber of the target laser in an optical signal propagation direction according to a configuration state of each wavelength selective switch (WSS) of the network element to be processed and an optical detection result of each port of the network element to be processed; and acquiring the optical detection result of each WSS to judge whether any WSS detects a light at a group port, wherein under the condition that the target laser is an optical booster amplifier (OBA), before turning on the target laser, the method further comprises:

setting the configuration state of each WSS of the network element to be processed as null; and determining the connection position of the optical fiber of the target laser in the optical signal propagation direction according to the configuration state of each wavelength selective switch (WSS) of the network element to be processed and the optical detection result of each port of the network element to be processed comprises:

determining, under the condition that only one WSS detects light at a group port, the OBA as an OBA in an add-drop direction, and recording an optical fiber between the WSS that detects the light at the group port and the OBA in the add-drop direction as a first-position optical fiber;

under the condition that the target laser is an optical parametric amplifier (OPA), before turning on the target laser, the method further comprises:

setting the configuration state of each WSS of the network element to be processed as null; and determining the connection position of the optical fiber of the target laser in the optical signal propagation direction according to the configuration state of each wavelength selective switch (WSS) of the network element to be processed and the optical detection result of each port of the network element to be processed comprises:

setting, under the condition that only one WSS detects light at a group port, a configuration state of the WSS that detects the light at the group port as cross configuration:

acquiring an optical detection result of each optical transform unit (OTU) of the network element to be processed;

determining, under the condition that no OTU detects the light, the OPA as an OPA in a line direction, and recording an optical fiber between the OPA in the line direction and the WSS that detects the light at the group port as a fourth-position optical fiber; and determining, under the condition that only one OTU detects the light, the OPA as an OPA in an add-drop direction, and recording an optical fiber between the OPA in the add-drop direction and the WSS that detects the light at the group port as a fifth-position optical fiber:

under the condition that the target laser is an OTU, before turning on the target laser, the method further comprises:

setting the configuration state of each WSS of the network element to be processed as cross configuration; and determining the connection position of the optical fiber of the target laser in the optical signal propagation direction according to the configuration state of each wavelength selective switch (WSS) of the network element to be processed and the optical detection result of each port of the network element to be processed comprises:

recording, under the condition that only one WSS detects the light at the branch port, an optical fiber between the WSS that detects the light at the branch port and the OTU as a ninth-position optical fiber.

11. The optical fiber connection discovery method according to claim 4, wherein after recording the optical fiber between the OPA in the add-drop direction and the WSS that detects the light at the group port as the fifth-position optical fiber, the method further comprises:

recording an optical fiber between the OTU that detects the light and the WSS that detects the light at the group port as an eighth-position optical fiber.

12. The optical fiber connection discovery method according to claim 5, wherein after recording the optical fiber between the OPA in the add-drop direction and the WSS that detects the light at the group port as the fifth-position optical fiber, the method further comprises:

recording an optical fiber between the OTU that detects the light and the WSS that detects the light at the group port as an eighth-position optical fiber.

13. The optical fiber connection discovery method according to claim 1, wherein under the condition that the target laser is an OTU, before turning on the target laser, the method further comprises:

setting the configuration state of each WSS of the network element to be processed as cross configuration; and determining the connection position of the optical fiber of the target laser in the optical signal propagation direction according to the configuration state of each wavelength selective switch (WSS) of the network element to be processed and the optical detection result of each port of the network element to be processed comprises:

recording, under the condition that only one WSS detects the light at the branch port, an optical fiber between the WSS that detects the light at the branch port and the OTU as a ninth-position optical fiber.

14. The optical fiber connection discovery method according to claim 2, wherein under the condition that the target laser is an OTU, before turning on the target laser, the method further comprises:

setting the configuration state of each WSS of the network element to be processed as cross configuration; and determining the connection position of the optical fiber of the target laser in the optical signal propagation direction according to the configuration state of each wavelength selective switch (WSS) of the network element to be processed and the optical detection result of each port of the network element to be processed comprises:

recording, under the condition that only one WSS detects the light at the branch port, an optical fiber between the WSS that detects the light at the branch port and the OTU as a ninth-position optical fiber.

15. The optical fiber connection discovery method according to claim 3, wherein under the condition that the target laser is an OTU, before turning on the target laser, the method further comprises:

setting the configuration state of each WSS of the network element to be processed as cross configuration; and determining the connection position of the optical fiber of the target laser in the optical signal propagation direction according to the configuration state of each wavelength selective switch (WSS) of the network element to be processed and the optical detection result of each port of the network element to be processed comprises:

recording, under the condition that only one WSS detects the light at the branch port, an optical fiber between the WSS that detects the light at the branch port and the OTU as a ninth-position optical fiber.

16. The optical fiber connection discovery method according to claim 1, wherein under the condition that the target laser is an OTU, before turning on the target laser, the method further comprises:

setting the configuration state of each WSS of the network element to be processed as cross configuration; and determining the connection position of the optical fiber of the target laser in the optical signal propagation direction according to the configuration state of each wavelength selective switch (WSS) of the network element to be processed and the optical detection result of each port of the network element to be processed comprises:

recording, under the condition that only one WSS detects the light at the branch port, an optical fiber between the WSS that detects the light at the branch port and the OTU as a ninth-position optical fiber.

17. The optical fiber connection discovery method according to claim 4, wherein under the condition that the target laser is an OTU, before turning on the target laser, the method further comprises:

setting the configuration state of each WSS of the network element to be processed as cross configuration; and determining the connection position of the optical fiber of the target laser in the optical signal propagation direction according to the configuration state of each wavelength selective switch (WSS) of the network element to be processed and the optical detection result of each port of the network element to be processed comprises:

recording, under the condition that only one WSS detects the light at the branch port, an optical fiber between the WSS that detects the light at the branch port and the OTU as a ninth-position optical fiber.

* * * * *